United States Patent [19]

Williams et al.

[11] Patent Number: 5,788,291

[45] Date of Patent: Aug. 4, 1998

[54] DETACHABLE HOSE ASSEMBLY WITH DEBRIS CAVITY

[76] Inventors: Jack R. Williams, 6185 Port Au Prince, Riverside, Calif. 92506; Cary Shuker, 2290 Mt. Vernon, Riverside, Calif. 92507

[21] Appl. No.: 684,697

[22] Filed: Jul. 19, 1996

[51] Int. Cl.⁶ .................................................. F16L 37/26
[52] U.S. Cl. .................................................. 285/325
[58] Field of Search ............................. 285/325, 326, 285/327

[56] References Cited

U.S. PATENT DOCUMENTS

| | | |
|---|---|---|
| 210,923 | 12/1878 | Davies . |
| 779,479 | 6/1905 | Howell . |
| 792,074 | 6/1905 | Rathburn . |
| 823,346 | 6/1906 | Maxwell . |
| 942,047 | 12/1909 | Atkinson . |
| 959,854 | 5/1910 | Grierson . |
| 979,481 | 12/1910 | Hannold . |
| 1,169,389 | 1/1916 | Forsman . |
| 1,252,660 | 1/1918 | Clay ................................. 285/325 |
| 1,806,788 | 5/1931 | Cross et al. ....................... 285/327 |
| 1,838,574 | 12/1931 | Ross . |
| 1,996,218 | 4/1935 | Swanson .......................... 285/325 |
| 2,265,268 | 12/1941 | Culligan . |
| 2,279,733 | 4/1942 | Cross ............................... 285/325 |
| 2,950,130 | 8/1960 | Schneider ........................ 285/325 |
| 4,422,472 | 12/1983 | Klein ............................... 285/325 |
| 4,767,136 | 8/1988 | Lehmann .......................... 285/325 |

FOREIGN PATENT DOCUMENTS

| | | | |
|---|---|---|---|
| 464106 | 4/1950 | Canada ............................ 285/326 |
| 635593 | 9/1936 | Germany ......................... 285/325 |
| 607455 | 8/1955 | Italy ................................. 285/327 |
| 632030 | 11/1949 | United Kingdom .............. 285/325 |

OTHER PUBLICATIONS

Copy of photograph of a connector device.

*Primary Examiner*—Eric K. Nicholson
*Attorney, Agent, or Firm*—Knobbe, Martens, Olson & Bear, LLP

[57] ABSTRACT

A detachable hose assembly for easily connecting a hose to a faucet without using a screwing motion. The detachable hose assembly is comprised of a hose member and a faucet member. The hose member is configured to be attached to a hose and has a front face and a central shaft for communication of water to the hose. The faucet member is configured to be attached to a faucet and has a front face and a central shaft for communication of water to the central shaft of the hose member. The hose member and faucet member are configured to be slidably coupled together in a first orientation to form a single central shaft so that the front faces of the hose member and the faucet member are positioned adjacent each other and the outer surfaces of the members are flush. A raised surface and a seal are positioned about the shaft so that when the hose and faucet members are coupled, the raised surface exerts a force against the seal in a direction parallel to the central shaft so that leakage is reduced. The front faces of the hose member and the faucet member are configured so that when the hose member and the faucet member are coupled together, a cavity will be formed between the front faces of the hose member and faucet member so that debris will be urged into the cavity when the members are engaged.

34 Claims, 4 Drawing Sheets

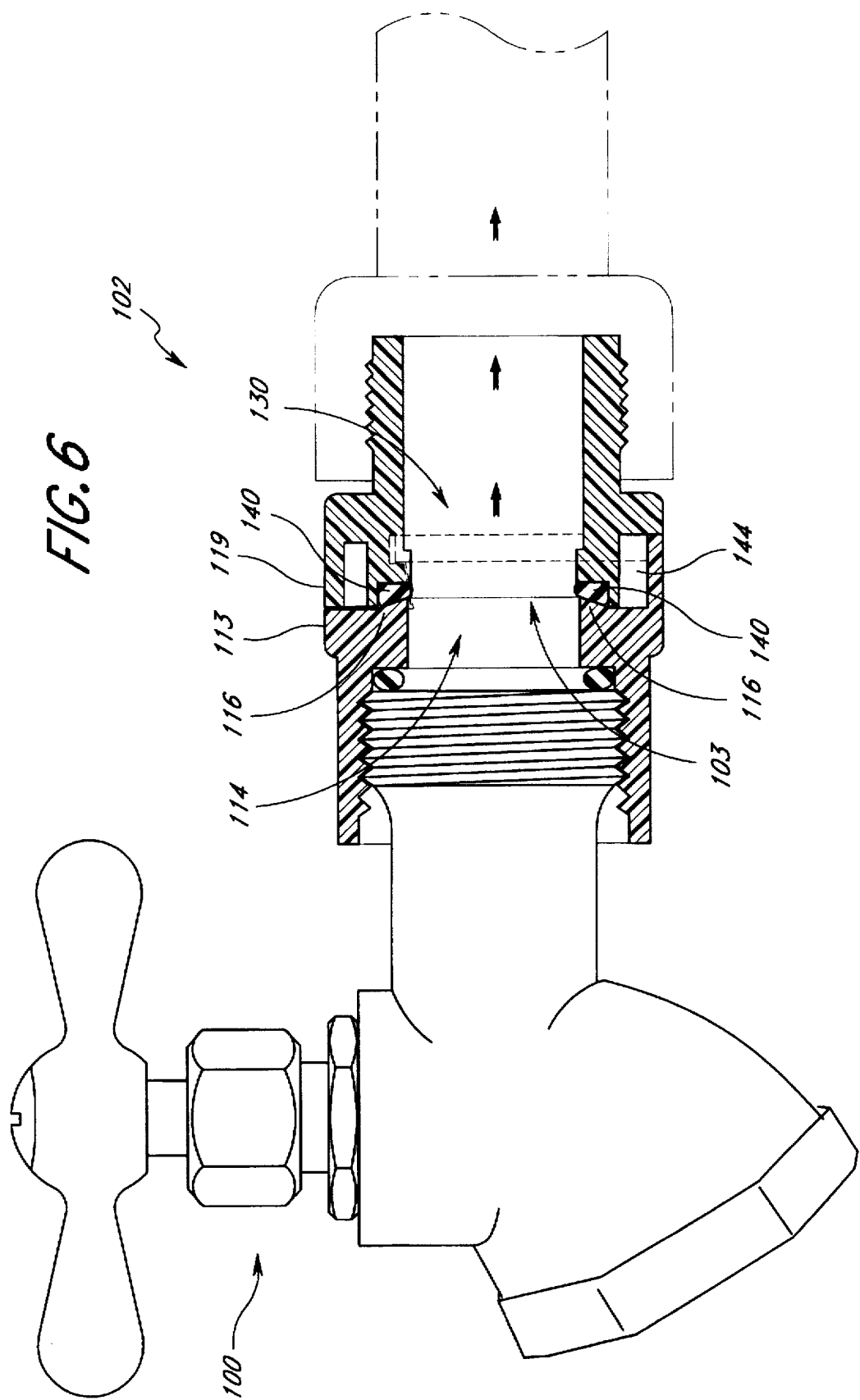

DETACHABLE HOSE ASSEMBLY WITH DEBRIS CAVITY

BACKGROUND OF THE INVENTION

1. Field of the Invention

The present invention relates to an apparatus for attaching a garden hose to a faucet and, in particular, concerns a device that allows for quick connection and disconnection of a hose to a faucet while reducing leakage about the connection and which is suitable for use in a high debris environment, such as a garden, and is configured to reduce the risk of cracking or splitting.

2. Description of the Related Art

The typical connection between a garden hose and a faucet employs threaded connections. Generally, the end of the hose is threaded and may be screwed onto a faucet with corresponding threads. Because one faucet does not always reach an entire garden, garden hoses are often repeatedly connected and disconnected to various faucets throughout a garden. One problem that exists with screw-on hoses is that they generally take a large amount of time and effort to screw onto a faucet, making it inefficient to continually connect and disconnect a hose. Another problem is that continuously screwing a hose on and off of a faucet may damage or warp the fine threads that line the connections, which makes it difficult to easily connect the hose to the faucet. Further, damage to the threads often results in leaks forming at the interface between the hose and faucet. Moreover, as a hose is used outside, such as in a garden, dirt and other debris may catch in the threads of the hose, which makes it even more difficult to screw the hose onto the faucet and is an additional cause of leaks.

To address these particular problems, connectors are sometimes used that attach to the respective ends of a hose and a faucet and allow for connection therebetween without the use of threads or a screwing motion. One such type of device is composed of male and female member, both of which are cylindrically shaped and contain a center shaft. The male member is attached to a faucet and has a cylindrically shaped projection that fits into the center shaft of the female member, which is attached to a hose. The male member is then inserted into the female member and coupling between the hose and faucet is secured through the use of latches that project into the center shaft of the female member and lock into the male member. The latches are released by depressing buttons located along the outside surface of the female member, allowing the male member to be pulled free of the female member. Another such type of connector also employs male and female members that are cylindrically shaped and contain a center shaft. The male member has a projection that may be inserted into the shaft of the female member. A ring encircles the outer wall of the female member. The ring holds in place tiny spheres that project into the shaft and secure the male member when it is inserted. When the ring is slid along the longitudinal axis of the female member, the spheres are released, which allows the male member to be removed from or inserted into the shaft.

These types of hose coupling devices are inconvenient to use because they generally require two hands to couple or uncouple the hose from the faucet and therefore are not usable in cramped areas where only one hand can reach the faucet. Further, these types of connectors often do not provide a tight fit between the male and female members, which may result in leaking. Moreover, because the male members are designed to be inserted into the shaft of the female member, these devices cannot be used where there is little space to maneuver the male member along the longitudinal axis of the shaft.

Hence, while these devices have advantages over the screw-on connections, they still do not provide a suitably efficient connection between hoses and faucets. In other fields, alternatives types of connections have been developed. For example, U.S. Pat. No. 823,346 discloses a pipe-flange that may be used to connect the ends of opposing pipes and is comprised of a male and female member with a center shaft in which pipes may be inserted. The connecting face of the female member defines two curved wings that form a y-shaped gap therebetween that extends from the top to the bottom of the member. The connecting face of male member defines a protrusion that is shaped to fit into the y-shaped gap of the female member. The male member is coupled with the female member by sliding the protrusion of the male member into the wings on the female member. U.S. Pat. No. 2,265,268 is a pipe connector that is similar in design to the '346 patent. A female member is attached to one pipe and a male member is attached to the other pipe. The connecting face of the female member contains grooved wings that are spaced parallel from each other, defining a gap therebetween that extends from the top to the bottom of the member. The male member defines a wedge that extends from the top to the bottom of the member and is configured to be positioned in the gap. Specifically, the wedge is coupled with the female member by sliding the wedge of the male member into the wings of the female member.

While these designs may have some advantage over the previously disclosed threaded connections, they still have deficiencies which limit their adaptability to attaching hoses to faucets. Specifically, because there is no stop along the bottom of the female member in either of these devices, it is difficult to verify when the two members have been properly aligned. Hence, the male member may be inserted too deep into the female member, causing the female member to split or crack, or causing the shafts to be misaligned, which may facilitate leaking. Further, the connecting faces of the '346 and '268 devices are flat, making them susceptible to leaking if any inconsistencies exist in the surfaces or if debris get caught on the surfaces. Additionally, flat connecting faces are not conducive to a tight fit, as they do not provide planar compression between the two faces.

Hence, there is a need for a device that may be used to easily and quickly connect a garden hose to a faucet wherein the hose and faucet may be used in areas of high debris and can even be connected in cramped spaces. To this end, the person connecting the hose should be able to verify that a secure connection and proper alignment between the hose and faucet has been made by simply feeling the connection and not having to visually inspect the connection. Moreover, there is a need for a hose to faucet connection that can be easily connected with a low risk of splitting or cracking the connectors.

SUMMARY OF THE INVENTION

The aforementioned needs are satisfied by the present invention, which is comprised of a faucet member and hose member, each with an internal shaft. The faucet member is connected to a water dispenser such that the water dispenser may dispense water into the internal shaft of the member. The hose member is connected to a hose such that water may be dispensed through its internal shaft and into the hose. The two members may then be easily and securely coupled such that the water dispenser may dispense water through the internal shafts of the members and into the hose.

In one aspect of the invention, the two members are coupled by sliding the faucet member in a direction transverse to the internal shaft onto the hose member such that they are interlocked. In the preferred embodiment, the connecting face of the faucet member has a continuous wall that projects longitudinally outward from the edges of the face. Along the sides of the member, the wall forms two parallel wings that overhang the face and define two slots that preferably taper in size. The connecting face of the hose member defines two flanges that are configured such that they will fit into the slots on the faucet member. The faucet member and hose member are coupled by aligning the flanges on the hose member so that they are adjacent with the slots on the faucet member and then sliding the flanges, in a direction transverse to the axis of the members, into the slots. The continuous wall along the bottom edge of the faucet member provides a stop that will prevent the flanges on the hose member from being slid too deep into the slots of the faucet member and causing the faucet member to crack or split. When the faucet and hose members are fully coupled, their internal shafts will align such that water may pass from the dispenser, through the internal shafts in the members, and into the hose.

In another aspect of the invention, the outer surfaces of the faucet and hose members are flushly aligned when the two members are fully connected. Specifically, in the preferred embodiment the outer surfaces have the same outer radii and are configured so that when the hose member is correctly positioned in the faucet member so that the internal shafts of both the hose member and the faucet member are aligned, the outer surfaces are flush with each other at the interface between the two members. Thus, a complete connection may be verified by the user feeling the connection point between the two members with his or her hands and verifying that the outer surfaces of the two members are flushly aligned.

In another aspect of the invention, the device is configured to reduce the likelihood that dirt and debris that is located along the connecting faces of the members will impede the two members from being connected. To that end, the connecting face on the hose member is preferably configured such that a cavity will be formed when it is interconnected with the faucet member. Specifically, the hose member has a cavity recess formed in the connecting face of one of the members such that is configured so that when the hose member is positioned in the faucet member there is a gap between the front faces of the two members that can receive dirt and other debris positioned around the internal shaft. Hence, the cavity preferably captures the debris so that the debris does not impede the two members from being fully connected.

In another aspect of the invention, the internal shaft forms an aperture in the connecting face of the faucet member. The area that immediately surrounds the aperture bulges outward from the surface. The internal shaft also forms an aperture in the connecting face of the hose member. There is a recessed area immediately surrounding the aperture in the hose member. A seal fits into the recessed area such that the seal projects slightly outward from the surface of the face. When the faucet and hose member are interconnected, the bulge on the faucet member compresses against the seal on the hose member in a direction that is parallel to the shaft of the members, thereby providing a tight fit through planar compression of the seal about the entire circumference of the seal between the faces of the two members. In the preferred embodiment, the seal is an o-ring with a convex surface. The convex surface of the o-ring ensures that pressure is applied along its entire area by the bulge on the face of the faucet member. This provides a tighter fit between the two members and reduces the likelihood of leakage at the interface between the faucet and hose members.

Thus, the present invention provides a device that may be used to easily and quickly connect a garden hose to a faucet without using a screwing motion. The device contains a stop that prevent one member from being inserted to deep into the other member. Thus, the two members may be fully connected with a reduced risk of cracking or splitting the device. Further, the outer surfaces of the members are flushly aligned when the members are securely aligned and connected. After coupling the two members, a user can verify a secure connection by feeling with his or her hand whether the outer surfaces of the members are flushly aligned at the interface. The device also provides a tight fit between the two members that reduces the risk of leaking, even when it is used in outside areas, such a garden, where there is a lot of debris. These and other objects and features of the present invention will become more fully apparent from the following description and appended claims taken in conjunction with the accompanying drawings.

BRIEF DESCRIPTION OF THE DRAWINGS

These and other features of the invention will now be described with reference to the drawings of a preferred embodiment which is intended to illustrate and not to limit the invention, and in which:

FIG. 6 is a sectional view of the hose assembly of FIG. 1 taken along the lines 6—6 in FIG. 1.

DETAILED DESCRIPTION OF THE PREFERRED EMBODIMENT

Figure 1:
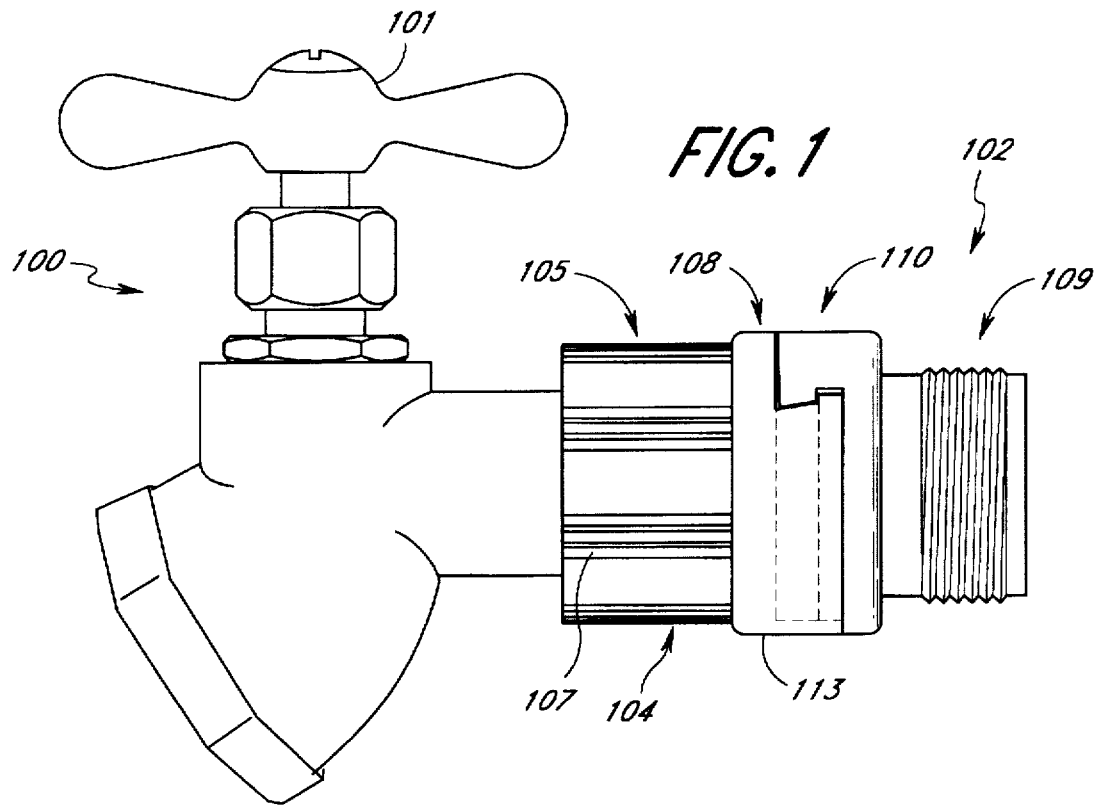
FIG. 1 is a side view of one preferred embodiment of an assembled hose assembly attached to a faucet.

Reference will now be made to the drawings wherein like numerals refer to like parts throughout. FIG. 1 is a side view of a detachable hose assembly 102 that is attached to a faucet 100. The faucet 100 is a standard water faucet of the type used in gardens. A knob 101 on the faucet 100 may be turned so that water will be dispensed out of a central shaft (not shown) within the faucet. The detachable hose assembly 102 may be used to couple a hose to faucet, such that the faucet may dispense water through the hose assembly 102 and into the hose, as shown in FIG. 6.

The detachable hose assembly 102 is cylindrically shaped with an internal shaft 103 that extends longitudinally along its length, as shown in FIG. 6. The detachable hose assembly 102 is comprised of a faucet member 104 and a hose member 106. The faucet member 104 is cylindrically shaped with an internal shaft 114 (FIGS. 3 and 6) that extends longitudinally through its length. The internal shaft 114 is threaded along one end and sized to be screwed onto a faucet, as shown in FIG. 6.

The faucet member 104 is divided into a first section 105 and a second section 108, each with a different radius. The first section 105 is cylindrical and extends longitudinally from one end of the faucet member 104. In the preferred embodiment, the outer surface of the first section 105 has a series of parallel grooves 107 that run in the longitudinal direction of the member. The grooves 107 may be grabbed and used to facilitate the screwing motion of the faucet member 104 onto a faucet.

The second section 108 of faucet member 104 extends longitudinally outward from first section 105 to an outer end 111 of faucet member 104, where it forms a substantially planar front face 112 (FIG. 2) that lies in a plane substantially normal to the longitudinal axis of the faucet member 104. The second section 108 is cylindrical with a smooth outer surface 113 and a radius that is greater than the radius of first section 105. As discussed more fully below, the front face 112 of the faucet member 104 defines two slots 124, shown in phantom in FIG. 2, that are configured to interlock with the hose member 106.

Figure 3:
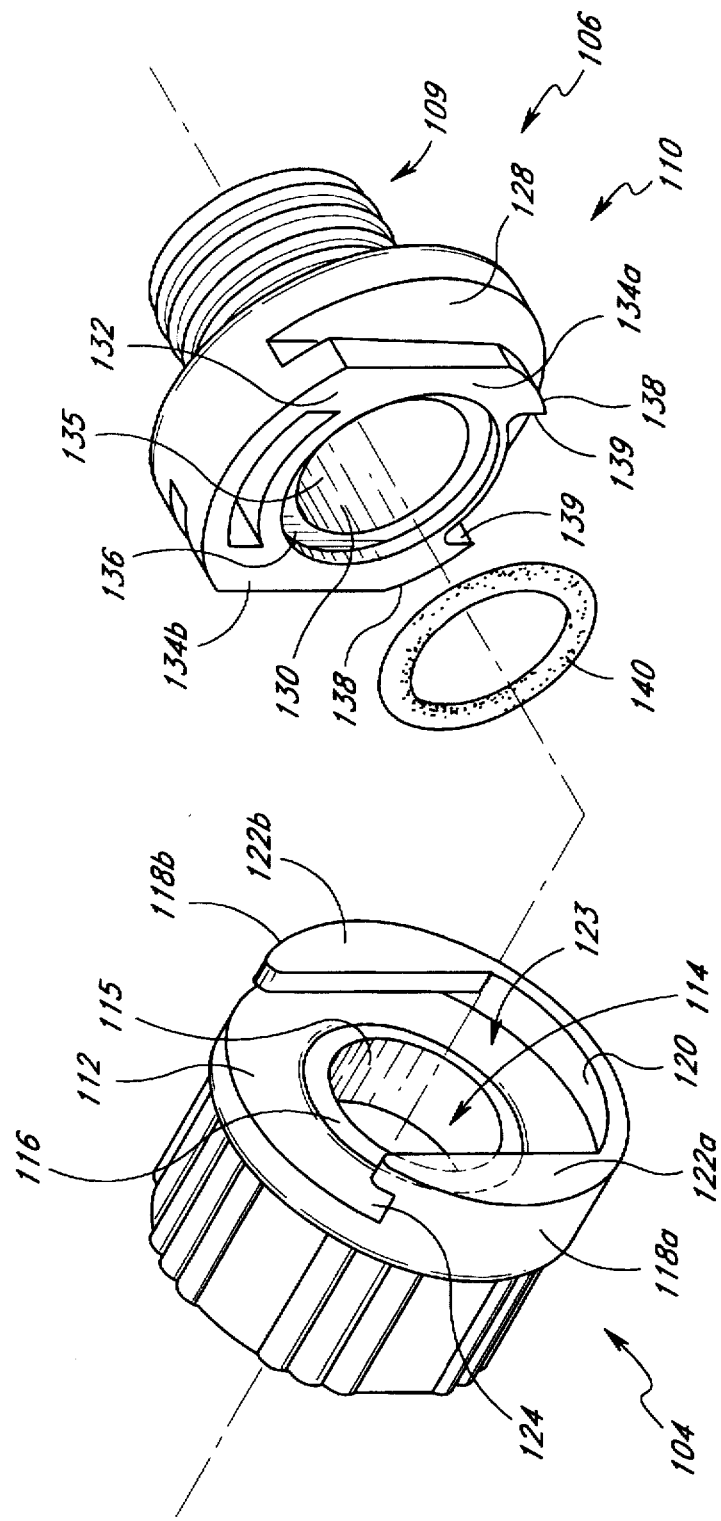
FIG. 3 is an exploded perspective view of the hose assembly shown in FIGS. 1 and 2.

The hose member 106 is cylindrically shaped with an internal shaft 130 (FIGS. 3 and 6) that extends longitudinally along its length. The hose member 106 is divided along its length into a first section 109 and a second section 110. As shown in FIGS. 1 and 3, the first section 109 is cylindrical and is threaded along a portion of its outer surface, with a radius configured to receive a hose.

Figure 5:
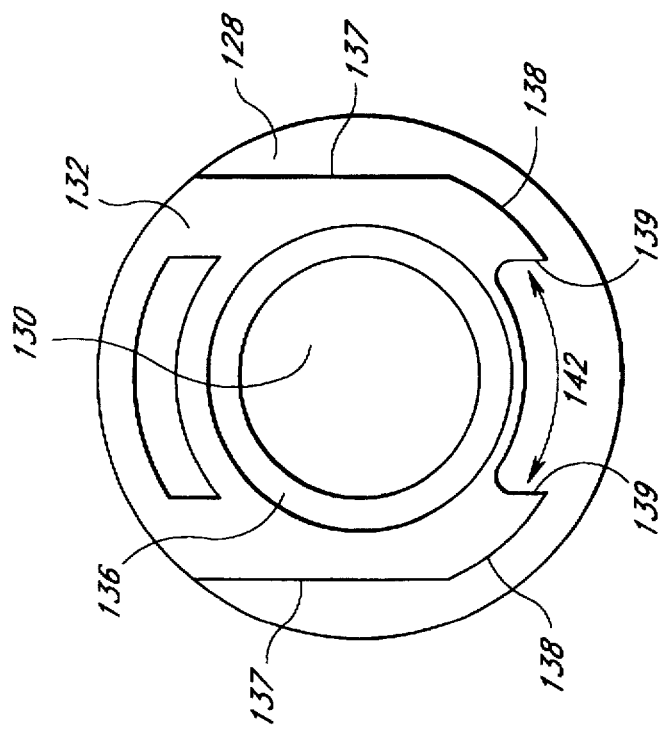
FIG. 5 is a front view of the hose member of the hose assembly of FIG. 1.

The second section 110 of the hose member 106 is cylindrical with a smooth outer surface 119 and a radius greater than the first section 109 of the hose member 106. The second section 110 extends longitudinally from first section 109 to the hose member inner end 117, where it forms a substantially planar hose member front face 132 (FIGS. 3 and 5). The hose member front face 132 lies in a plane substantially normal to the longitudinal axis of the hose member 106. As will be discussed more fully below, the hose member front face 132 is configured such that it may be interlocked with the front face 112 of the faucet member 108.

In the preferred embodiment of the invention, the radius of the second section 110 of the hose member 106 is equal to the radius of the second section 108 of the faucet member 104. Hence, when the faucet member 104 and the hose member 106 are securely coupled together, the faucet member outer surface 113 is flush with the hose member outer surface 119 at the interface between the two members, as shown in FIGS. 1 and 6. Hence, a user can verify that the hose member 106 is correctly seated in the faucet member 104 with the internal shafts 115 and 130 being aligned by feeling the interface point with his or her hands to ascertain whether the surfaces 113 and 119 are flush. Thus, it is not necessary to visually inspect the device to ensure that a secure connection has been made.

FIG. 3 is an exploded perspective view of the faucet member 104 and the hose member 106. The internal shaft 114 defines an aperture 115 within the front face 112 of the faucet member 104. The area immediately surrounding the aperture 115 protrudes outward from the front face 112 to form a raised lip 116. Specifically, as shown in FIG. 6, the raised lip 116 preferably slopes smoothly and uniformly outward from a plane defined by the front face 112. The smoothly sloped surface of the raised lip 116 is advantageous, as such a surface will not impede the progress of the hose member 106 as it is slidingly inserted into the faucet member 104.

Figure 4:
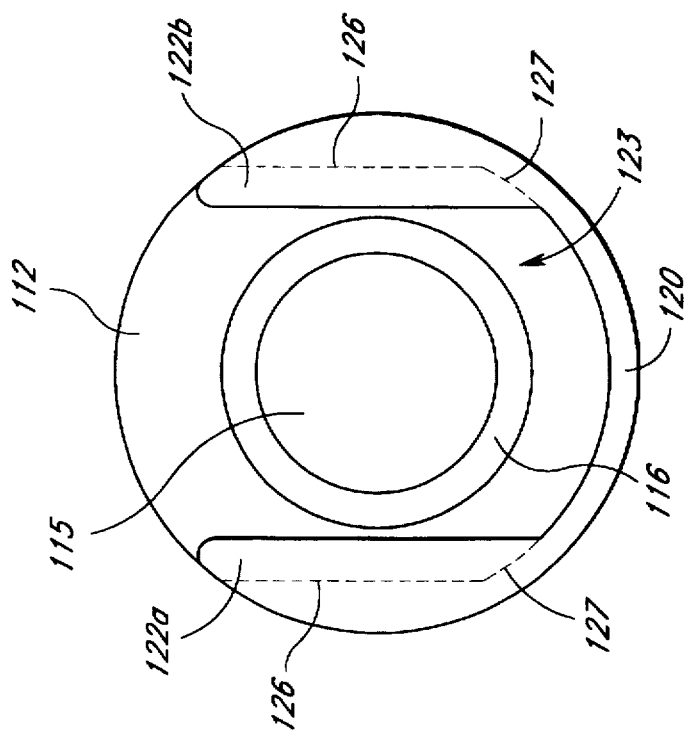
FIG. 4 is a front view of a faucet member of the hose assembly of FIG. 1.

Two planar wings 122a and 122b are mounted by two connecting sections 118a and 118b to the front face 112 of the first member 104. The connecting sections 118a and 118b are interposed between the wings 122 and the front face 112 of the first member 104. Specifically, the wings 122a and 122b define a plane that is preferably substantially parallel to the front face 112 so that the wings 122a and 122b define two wedge-shape slots 124 that lie between the wings 122a and 122b and the front face 112 of the faucet member 104. As shown in FIG. 4, the slots 124 preferably have straight, parallel side walls 126 and a curved bottom wall 127. Further, the wings 122a and 122b lie at opposite transverse ends of front face 112 and define a u-shaped aperture 123 therebetween that is open at one transverse end and bounded at the opposite transverse end by a bottom wall 120 that connects the bottom edges of the wings 122. The wall 120 and the connecting sections 118 preferably form the outer surface 113 of faucet member 104. Although the particular embodiment describes the configuration of the front face of the faucet member, a person skilled in the art will appreciate that this configuration could also be located on the front face of a hose member without departing from the spirit of the invention.

As shown in FIG. 3, the hose member 106 has a planar surface 128 that is normal to the longitudinal axis of the member. The hose member front face 132 is mounted on the surface 128 so as to extend outward from first planar surface 128. The front face 132 lies in a plane that is longitudinally displaced from and substantially parallel to planar surface 128. Two flanges 134a and 134b extend from the front face 132 so that they overhang the planar surface 128 on the hose member 106. The flanges 134 are configured such that they conform to the shape of slots 124 on the faucet member 104. In particular, the flanges 134 have the same length and width as the slots 124 and taper in thickness from top to bottom so that they are wedge shaped. Further, the flanges 134 preferably have straight parallel side edges 137 and curved bottom edges 138 (FIG. 5). A gap 142 is formed between two inner surfaces 139 of the curved bottom edges 138 of the hose member front face 132. The gap 142 preferably has a width that is substantially the same as the width of the aperture 135 in the front face 132 of the hose member 106. The purpose of the gap 142 will be described below in reference to FIG. 6.

Figure 2:
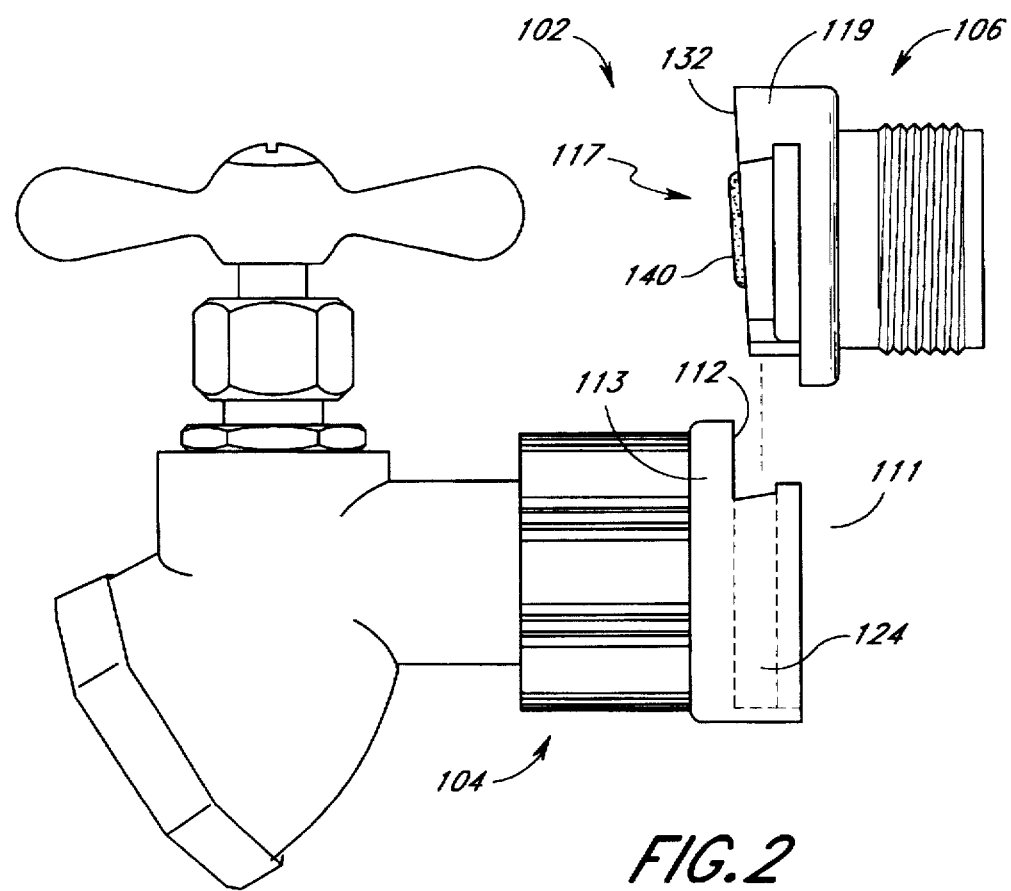
FIG. 2 is a side view of a the hose assembly of FIG. 1 in a disassembled state.

As illustrated in FIG. 3, the central shaft 130 forms a circular aperture 135 within the front face 132 of the hose member 106. A recessed lip 136 is positioned about the aperture 135 on the hose member front face 132. An annular seal 140 is configured to rest within the recessed lip 136 such that the seal 140 surrounds the aperture 135. The annular seal 140 has dimensions such that when it is resting within the recessed lip 136, a portion of the seal is within the recessed lip and a portion projects longitudinally outward from the surface of front face 132, as shown in FIG. 2. Preferably, the recess 136 is slightly concave to retain the seal 140 in the recess 136.

In the preferred embodiment, the seal 140 is an o-ring with a rounded surface and is made of a compressibly deformable material, such as rubber. A seal with a rounded surface is advantageous over a flat surfaced seal, as a rounded surface tends to slide smoother over the front face 112 of the faucet member 104 as the hose member 106 is slid into the faucet member 104. Although the particular embodiment describes the seal as being located on the hose member and the raised surface being located on the faucet member, a person skilled in the art will appreciate that the positions of the seal and the raised surface could be interchanged without departing from the scope of the invention.

The faucet and hose members 104 and 106 are coupled together by positioning the flange bottom edges 138 of the flanges 134a and 134b within the open end of the u-shaped aperture 123 of the faucet member 104 so that the front faces 112 and 132 are positioned adjacent each other in substantially the same plane. The flanges 134 are then slid into the slots 122 so that the faucet member 104 and the hose member 106 will be coupled together with the front faces 112 and 132 adjacent each other.

The device is configured to reduce the likelihood that the hose member will be over-inserted into the faucet member. The wedge shape of the flanges 134 and the slots 124 causes the fit between the flanges and the slots to become tighter as the flanges are inserted into the slots. However, because the flanges 134 are the same length as the slots 124, the flanges 134 may only travel a certain distance into the slots 124, at which point the bottom edges 138 of the flanges 134 will butt against the bottom wall 120 on the faucet member 104. The wall 120 is positioned such that it will stop the hose member 106 from being inserted any deeper than is necessary to align the internal shafts 114 and 130. Hence, the bottom wall 120 acts as a stop that reduces the likelihood that the hose member 106 will be over-inserted into the faucet member 104. This configuration decreases the likelihood that the hose member will crack or split the faucet member during coupling and increases the likelihood that the internal shafts 115 and 130 will be correctly aligned.

Referring to FIG. 6, when the faucet member 104 and the hose member 106 are coupled together, the gap 142 forms a cavity 144 between the front face 112 of the faucet member 104 and the front face 132 of the hose member 106. The cavity 144 serves a useful purpose. As the faucet member 104 and hose member 106 are being slidingly connected, dirt and other debris located on the front faces 112 and 132 will preferably be swept onto the bottom wall 120. Preferably, debris will be caught within the cavity 144, rather than at the meeting point between the bottom edges 138 of the flanges 134 and the wall 120. This configuration reduces the likelihood that dirt and other debris will interfere with a complete connection between the hose member and the faucet member and proper alignment of the shaft 114 and 130. It will be appreciated that in the preferred embodiment, the shafts 114 and 130 have the same radius and are aligned to form a single shaft 180 when the hose member 106 is seated in the faucet member 104.

Further, as shown in FIG. 6, when the faucet member 104 is fully coupled with the hose member 106, the raised lip 116 aligns with and compresses against the seal 140. This configuration preferably provides a secure seal at the meeting point between the internal shafts 114 and 130, as seen in FIG. 6. The compression between the seal 140 and the raised lip 116 also provides planar compression between front faces 112 and 132, which contributes to a secure and tight fit between the hose member 104 and the faucet member 106. Preferably, this will reduce leakage at the interface between the two members.

As shown from FIG. 6, when the faucet member 104 is fully coupled with the hose member 106, internal shafts 114 and 130 are aligned such that water may flow through faucet member 104 and into hose member 106. In this way, the detachable hose assembly 102 may be used as an easily detachable interface between a hose and a faucet that will pass water from the faucet, through the internal shaft of hose assembly 100, and into a hose. Coupling is easily accomplished without the use of a screwing motion. It will be appreciated that a single hose member can be mounted on a hose and a plurality of faucet members can be mounted on each of the faucets on the outside of a building. In this situation, the apparatus allows for the hose to be easily and quickly mounted on different faucets in a simple and efficient manner. Moreover, in the preferred embodiment, the faucet and hose members are made through injection molding techniques which results in inexpensive components for the assembly.

Further, a secure connection between the two members is easily verified by the user feeling the connection points with his or her hand and ensuring that the outer surfaces of the hose and faucet members are flush. Moreover, because the wall 120 prevents the hose member from being inserted too deep into the faucet member, the members can be quickly coupled with a reduced risk of over-insertion and misalignment of the shafts. The seal 140 helps to provide a tight fit between the two members and greatly reduces the risk of leaking. The device is suited for use in areas with high levels of dirt and other debris, such as a garden. As discussed, the cavity 144 is designed to capture dirt and other debris so that it will not interfere with a secure connection between the two members.

Although the preferred embodiment of the present invention has shown, described, and pointed out the fundamental novel features of the invention as applied to these embodiments, it will be understood that various omissions, substitutions, and changes in the form of the detail of the device illustrated, may be made by those skilled in the art without departing from the spirit of the present invention. Consequently, the scope of the invention should not be limited to the foregoing discussion, but is to be defined by the claims which follow.

What is claimed is:

1. An apparatus for connecting a hose to a faucet, the apparatus comprising:

a hose member having an outer surface and being configured to be attached to a hose, the hose member having a front face and having a central shaft for communication of water to the hose and wherein the central shaft defines an aperture in the front face of the hose member;

a faucet member having an outer surface and being configured to be attached to a faucet, the faucet member having a front face and a central shaft for communication of water to the central shaft of the hose member and wherein the central shaft of the faucet member defines an aperture in the front face of the faucet member and wherein both the hose member and the faucet member are configured so that the faucet member and the hose member can be coupled together in a first orientation so that the front faces of the hose and faucet members are positioned adjacent each other and define an interface and so that a single central shaft is formed by the central shafts of the hose and faucet members and wherein the faucet member and the hose member are further adapted to be slidably engaged with each other so as to define a cavity having a first and a second transverse wall wherein the cavity is positioned at the interface between the faucet member and the hose member so that debris that is positioned on the front faces of the members will be urged into the cavity when the members are coupled together and are retained therein by the first and second transverse walls;

a raised surface positioned about the single central shaft adjacent the interface between the front face of the faucet member and the front face of the hose member; and a seal having an outer surface, the seal being positioned about the single central shaft adjacent the interface between the front face of the faucet member and the front face of the hose member so that when the faucet member and the hose member are coupled together, the raised surface exerts a force against the outer surface of the seal in a direction that is parallel to the central shaft so that the seal is compressed between the raised surface and one of the faces of the members so that leakage of water from the single central shaft at the interface between the hose member and the faucet member is reduced.

2. The apparatus of claim 1, wherein the front face of the hose member and the front face of the faucet member are configured such that the front face of the hose member may be slidably engaged with the front face of the faucet member in a first direction transverse to the central shafts within the hose and faucet members.

3. The apparatus of claim 2, wherein the raised surface is located on the front face of the faucet member and wherein a recessed lip is positioned about the aperture in the front face of the hose member, and wherein the recessed lip is configured such that the seal may rest within the recessed lip so that a portion of the seal will project outward from the front face of the hose member.

4. The apparatus of claim 3, wherein the seal has a rounded outer surface that is positioned beyond the front face of the hose member.

5. The apparatus of claim 2, wherein a first portion of the outer surface of the faucet member is flush with a second portion of the outer surface of the hose member when the faucet member and hose member are coupled together in the first orientation so that a user can verify by touch that the faucet and hose members are in the first orientation.

6. The apparatus of claim 5 wherein the first portion of the outer surface of the faucet member is located adjacent the interface and the second portion of the outer surface of the hose member is located adjacent the interface.

7. The apparatus of claim 2, wherein the central shaft of the faucet member is aligned with the central shaft of the hose member when the faucet member and the hose member are coupled together in the first orientation so that leakage at the interface between the faucet member and the hose member is reduced.

8. The apparatus of claim 7, wherein the front face of the faucet member and the front face of the hose member are configured so that the faucet member and the hose member can be slidably engaged in the first direction no more than a first distance and wherein the members are in the first orientation when the members have been slidably engaged the first distance.

9. The apparatus of claim 1, wherein the cavity is configured so that the debris that is urged into the cavity will not interfere with the members travelling the first distance.

10. The apparatus of claim 7, wherein the hose member and the faucet member are cylindrically-shaped and the front face of the faucet member defines two slots and the front face of the hose member defines two flanges and wherein the two flanges are configured to be slidably engaged with the two slots so that the hose member and the faucet member are engaged in the first orientation.

11. The apparatus of claim 10 wherein the front face of the faucet member is closed at one transverse end such that the closed end will prevent the two members from being slidably engaged any further than the first distance.

12. An apparatus for connecting a hose to a faucet, the apparatus comprising:

a hose member having an outer surface and being configured to be attached to a hose, the hose member having a front face and having a central shaft for communication of water to the hose and wherein the central shaft defines an aperture in the front face of the hose member; and a faucet member having an outer surface and being configured to be attached to a faucet, the faucet member having a front face and a central shaft for communication of water to the central shaft of the hose member and wherein the central shaft of the faucet member defines an aperture in the front face of the faucet member and wherein both the hose member and the faucet member are configured so that the faucet member and the hose member can be coupled together along a first direction into a first orientation so that the front faces of the hose and faucet members are positioned adjacent each other and define an interface and so that a single, longitudinally extending central shaft is formed by the central shafts of the hose and faucet members and wherein a first portion of the outer surface of the faucet member is flush with a second portion of the outer surface of the hose member when the faucet member and hose member are coupled together in the first orientation so that a user can verify by touch that the faucet and hose members are in the first orientation and wherein the faucet member and the hose member are further adapted to be slidably engaged with each other to define a cavity between the front face of the faucet member and the front face of the hose member so that debris that is positioned on the front faces of the members will be urged into the cavity when the members are coupled, the cavity being bounded on transverse sides by a pair of opposed walls so that the cavity extends between the opposed walls in a direction substantially perpendicular to the first direction.

13. The apparatus of claim 12, wherein the front face of the hose member and the front face of the faucet member are configured such that the front face of the hose member may be slidably engaged with the front face of the faucet member in a first direction transverse to the central shafts within the hose and faucet members.

14. The apparatus of claim 12, further comprising a seal having an outer surface, the seal, being positioned about the single central shaft adjacent the interface between the front face of the faucet member and the front face of the hose member.

15. The apparatus of claim 14, wherein a raised surface is positioned about the single central shaft adjacent the interface between the front face of the faucet member and the front face of the hose member so that when the faucet member and the hose member are coupled together, the raised surface exerts a force against the outer surface of the seal in a direction that is parallel to the central shaft so that the seal is compressed between the raised surface and one of the faces of the members so that leakage of water from the single central shaft at the interface between the hose member and the faucet member is reduced.

16. The apparatus of claim 15, wherein the raised surface is located on the front face of the faucet member and wherein a recessed lip is positioned about the aperture in the front face of the hose member, and wherein the recessed lip is configured such that the seal may rest within the recessed lip so that a portion of the seal will project outward from the front face of the hose member.

17. The apparatus of claim 16, wherein the seal has a rounded outer surface that is positioned beyond the front face of the hose member.

18. The apparatus of claim 17, wherein the central shaft of the faucet member is aligned with the central shaft of the hose member when the faucet member and the hose member are coupled together in the first orientation so that leakage at the interface between the faucet member and the hose member is reduced.

19. The apparatus of claim 18, wherein the front face of the faucet member and the front face of the hose member are configured so that the faucet member and the hose member can be slidably engaged in the first direction no more than a first distance and wherein the members are in the first orientation when the members have been slidably engaged the first distance.

20. The apparatus of claim 12, wherein the cavity is configured so that the debris that is urged into the cavity will not interfere with the members travelling the first distance.

21. The apparatus of claim 18, wherein the hose member and the faucet member are cylindrically-shaped and the front face of the faucet member defines two slots and the front face of the hose member defines two flanges and wherein the two flanges are configured to be slidably engaged with the two slots so that the hose member and the faucet member are engaged in the first orientation.

22. The apparatus of claim 21 wherein the front face of the faucet member is closed at one transverse end such that the closed end will prevent the two members from being slidably engaged any further than the first distance.

23. An apparatus for connecting a hose to a faucet, the apparatus comprising:

a hose member having an outer surface and being configured to be attached to a hose, the hose member having a front face and having a central shaft for communication of water to the hose and wherein the central shaft defines an aperture in the front face of the hose member; and a faucet member having an outer surface and being configured to be attached to a faucet, the faucet member having a front face and a central shaft for communication of water to the central shaft of the hose member and wherein the central shaft of the faucet member defines an aperture in the front face of the faucet member and wherein both the hose member and the faucet member are configured so that the faucet member and the hose member can be coupled together in a first orientation so that the front faces of the hose and faucet members are positioned adjacent each other and define an interface and so that a single central shaft is formed by the central shafts of the hose and faucet members and wherein the front faces of the faucet member and the hose member are configured so that when the faucet member is coupled with the hose member, a cavity is formed between the front face of the faucet member and the front face of the hose member so that debris that is positioned on the front faces of the members will be urged into the cavity when the members are coupled, the cavity being enclosed on lateral sides by a pair of opposed walls located at the interface between the hose member and the faucet member wherein the opposed walls are spaced apart a distance substantially equal to the width of the central shaft.

24. The apparatus of claim 23, wherein the front face of the hose member and the front face of the faucet member are configured such that the front face of the hose member may be slidably engaged with the front face of the faucet member in a first direction transverse to the central shafts within the hose and faucet members.

25. The apparatus of claim 24, further comprising a seal having an outer surface, the seal being positioned about the single central shaft adjacent the interface between the front face of the faucet member and the front face of the hose member.

26. The apparatus of claim 25, wherein a raised surface is positioned about the single central shaft adjacent the interface between the front face of the faucet member and the front face of the hose member so that when the faucet member and the hose member are coupled together, the raised surface exerts a force against the outer surface of the seal in a direction that is parallel to the central shaft so that the seal is compressed between the raised surface and one of the faces of the members so that leakage of water from the single central shaft at the interface between the hose member and the faucet member is reduced.

27. The apparatus of claim 26, wherein the raised surface is located on the front face of the faucet member and wherein a recessed lip is positioned about the aperture in the front face of the hose member, and wherein the recessed lip is configured such that the seal may rest within the recessed lip so that a portion of the seal will project outward from the front face of the hose member.

28. The apparatus of claim 25, wherein the seal has a rounded outer surface that is positioned beyond the front face of the hose member.

29. The apparatus of claim 24, wherein a first portion of the outer surface of the faucet member is flush with a second portion of the outer surface of the hose member when the faucet member and hose member are coupled together in the first orientation so that a user can verify by touch that the faucet and hose members are in the first orientation.

30. The apparatus of claim 29 wherein the first portion of the outer surface of the faucet member is located adjacent the interface and the second portion of the outer surface of the hose member is located adjacent the interface.

31. The apparatus of claim 30, wherein the front face of the faucet member and the front face of the hose member are configured so that the faucet member and the hose member can be slidably engaged in the first direction no more than a first distance and wherein the members are in the first orientation when the members have been slidably engaged the first distance.

32. The apparatus of claim 31, wherein the cavity is configured so that the debris that is urged into the cavity will not interfere with the members travelling the first distance.

33. The apparatus of claim 23, wherein the hose member and the faucet member are cylindrically-shaped and the front face of the faucet member defines two slots and the front face of the hose member defines two flanges and wherein the two flanges are configured to be slidably engaged with the two slots so that the hose member and the faucet member are engaged in the first orientation.

34. The apparatus of claim 33 wherein the front face of the faucet member is closed at one transverse end such that the closed end will prevent the two members from being slidably engaged any further than the first distance.

* * * * *